United States Patent [19]

Omitsu

[11] Patent Number: 4,523,565
[45] Date of Patent: Jun. 18, 1985

[54] CONTROL SYSTEM AND METHOD FOR A FUEL DELIVERY SYSTEM

[75] Inventor: Takashi Omitsu, Madison, Wis.

[73] Assignee: Aisin Seiki Kabushiki Kaisha, Japan

[21] Appl. No.: 595,508

[22] Filed: Mar. 30, 1984

[51] Int. Cl.³ ............................................. F02D 11/10
[52] U.S. Cl. .................................... 123/399; 123/478
[58] Field of Search ............... 123/399, 400, 401, 342, 123/352, 478, 479

[56] References Cited

U.S. PATENT DOCUMENTS

| | | | |
|---|---|---|---|
| 4,168,679 | 9/1979 | Ikeura et al. | 123/399 X |
| 4,346,776 | 8/1982 | Taplin | 123/342 X |
| 4,352,404 | 10/1982 | Stier | 180/179 |
| 4,424,785 | 1/1984 | Ishida et al. | 123/479 |
| 4,474,083 | 10/1984 | Braun | 123/342 X |

FOREIGN PATENT DOCUMENTS 35240 3/1983 Japan ................................ 123/479

Primary Examiner—Tony M. Argenbright
Attorney, Agent, or Firm—Banner, Birch, McKie & Beckett

[57] ABSTRACT

What is disclosed is a system and method for effecting either automatic or manual control of a fuel delivery system for delivering a variable quantity of fuel to the engine of a power delivery system. Switching between automatic control and manual control does not occur until a smooth transition between control modes is assured. This is accomplished by ensuring that the pre-switching state of the fuel delivery means corresponds to an actual output power or torque which is substantially equal to the desired ouptut power or torque commanded by the manual control.

16 Claims, 10 Drawing Figures

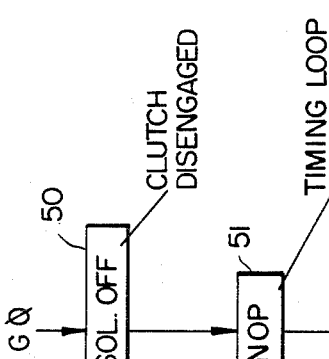
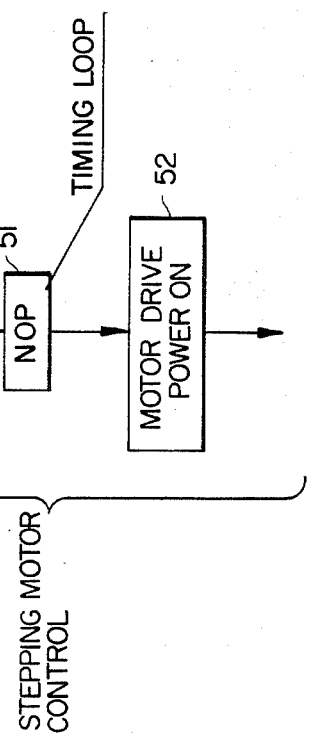
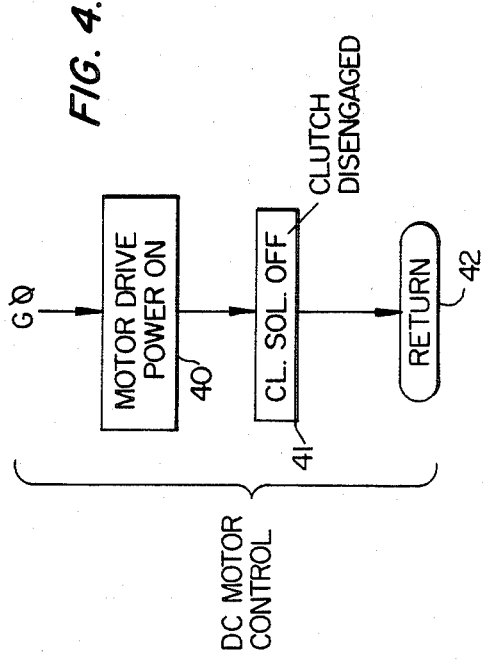
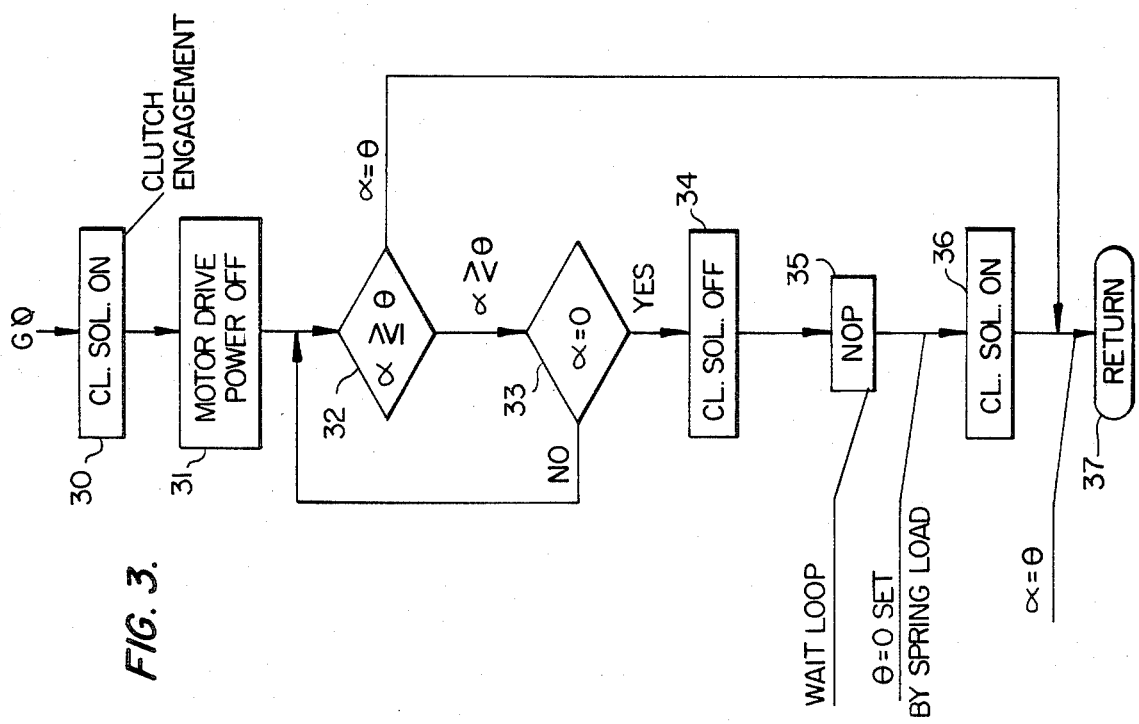

CONTROL SYSTEM AND METHOD FOR A FUEL DELIVERY SYSTEM

BACKGROUND OF THE INVENTION

The present invention relates generally to the field of fuel delivery devices, and more particularly, is directed to a system and method for effecting either automatic or manual control of a fuel delivery system for delivering a variable quantity of fuel to the engine of a power delivery apparatus.

With the present emphasis in the automotive industry toward improving fuel economy and reducing exhaust emissions, there has been much research and development directed toward providing automatic systems for controlling the operation of a motor vehicle. Some of the research and development has focussed on systems for controlling the fuel delivered to the engine of the vehicle. One such system is disclosed in U.S. Pat. No. 4,424,785, issued in the name of Ishida et al. In this system, various parameters such as the degree of movement of the accelerator pedal, air flow within the engine intake bore and throttle valve position are provided to a control unit which compares these parameters with pre-programmed values to provide an optimum throttle valve setting for the engine. Should the control unit fail, however, the throttle cannot be controlled and the vehicle can not be run. Ishida recognized this deficiency and discloses an auxiliary control unit which assumes control over the throttle when the main control unit is out of order. When the main unit malfunctions, the auxiliary unit is immediately activated. The auxiliary unit, however, provides only limited throttle control, sufficient only to drive the vehicle at low speed to a service station to effect repair of the main unit.

While the Ishida system represents an improvement over such systems known in the prior art, his system is also deficient. For example, in Ishida, the auxiliary control unit immediately assumes control of the throttle valve when the main unit malfunctions. No provisions are provided for returning the throttle valve to a predetermined position or ascertaining the position of the throttle valve so that control can be smoothly passed to the auxiliary unit. Thus, the vehicle may lurch forward or stall until the throttle valve setting matches the auxiliary control unit demand. Moreover, in the Ishida system, the auxiliary control unit provides only limited throttle operation. Thus, the vehicle may be operated only at low speeds until the main unit is repaired. Restricting the vehicle to low speed operation can be dangerous in some situations, as for example freeway driving. It can also be dangerous during routine city driving as well as traffic conditions often demand rapid acceleration. Thus, while Ishida represents an improvement over prior fuel delivery control systems, it is not the ideal system.

SUMMARY OF THE INVENTION

It is the overall object of the present invention to provide a system and method for controlling the operation of a fuel delivery system which can be switched between manual and automatic control.

It is a specific object of the present invention to provide a system and method for controlling the operation of a fuel delivery system for a vehicle which can be smoothly switched between automatic and full manual control without causing the vehicle to lurch forward or stall.

It is another specific object of the present invention to provide a system and method for controlling the operation of a fuel delivery system for a vehicle which, when under manual control, provides full operation of the vehicle.

It is a further specific object of the present invention to provide a system for controlling the operation of a fuel delivery system for a vehicle which does not impair the safety of the vehicle driver or hamper the operation of the vehicle.

The present invention relates to a system for automatically or manually controlling the operation of a fuel delivery system for a vehicle, as for example, a throttle valve. The system comprises a control unit which receives a signal indicating accelerator pedal position and a signal indicating the position of the throttle valve. These signals are processed to provide a control signal to a DC motor which automatically sets the throttle position for optimum performance of the venicle, as for example, to maintain the vehicle along its ideal operating line. The control unit also provides an output signal which controls a clutch. The clutch connects the accelerator pedal directly to the throttle valve when manual control is desired. During manual control, the vehicle driver has full control of the vehicle. Changing control from automatic to manual, however, does not occur until the throttle valve is moved either to a predetermined position or is positioned to match what is commanded by the accelerator pedal. Thus, the vehicle is prevented from lurching forward or stalling when control is shifted from automatic to manual.

In accordance with the present invention, control of the throttle valve may be selected by the vehicle driver for automatic or manual control. It is anticipated that the throttle valve will normally be controlled by the automatic control unit until the unit malfunctions or some other fault is detected. Upon a malfunction or detection of a fault, the unit can be switched to manual control either at the command of the vehicle operator or as a result of the malfunction being detected by the automatic control unit itself and effecting a switch-over to manual control.

It is also anticipated that the control system of the present invention may be used in conjunction with a system for controlling the operation of a continuously variable transmission as disclosed in applicant's pending and commonly assigned application Ser. Nos. 380,922 and 380,923 filed May 21, 1982, now U.S. Pat. Nos. 4,459,878 and 4,458,560, and which are incorporated herein by reference. At high transmission ratios, it is desirable to manually control the throttle valve position while at low transmission ratios, automatic control is preferred.

BRIEF DESCRIPTION OF THE DRAWINGS

FIG. 3 is a flow chart illustrating a computer subroutine used for switching from automatic control to manual control in accordance with the present invention.

FIG. 4 is a flow chart illustrating a computer subroutine used for switching from manual control to automatic control in accordance with the present invention where the throttle valve is driven by a DC motor.

FIG. 5 is a flow chart illustrating a computer subroutine used for switching from manual control to automatic control in accordance with the present invention where the throttle valve is controlled by a stepper motor.

DETAILED DESCRIPTION OF THE PREFERRED EMBODIMENT

Figure 1:
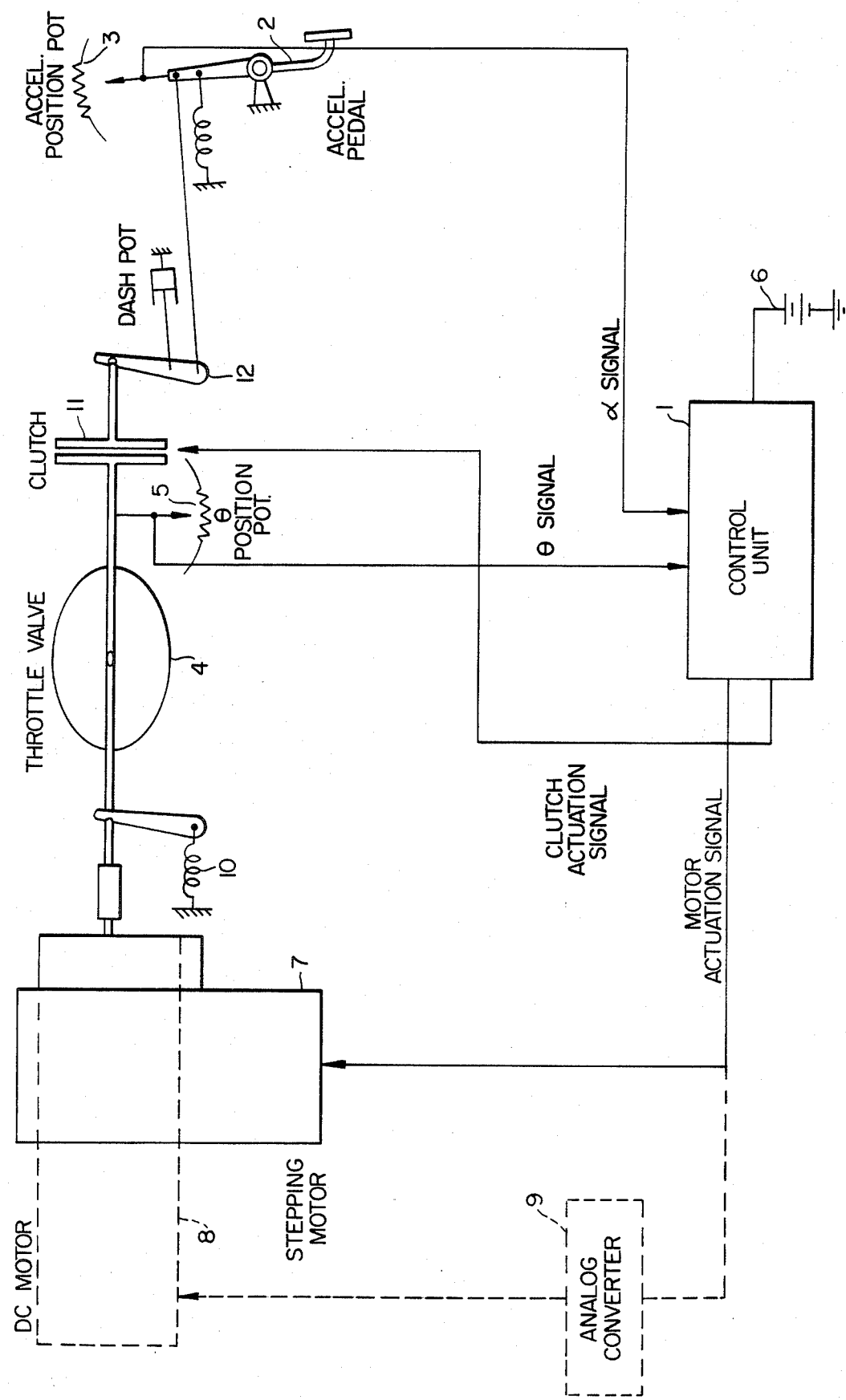
FIG. 1 is a block diagram of the system for controlling the fuel delivery system of an engine in accordance with the present invention.

The present invention comprises a number of interrelated elements, all of which are shown in at least some detail in FIG. 1. With reference to FIG. 1, the system in accordance with the present invention comprises control unit 1 powered by battery 6. Control unit 1 may comprise a micro-processor or may be formed with discrete components. Battery 6 may be specifically dedicated to control unit 1 or may be the main storage battery for the host vehicle. Accelerator pedal position signal $\alpha$ is provided to control unit 1 from accelerator pedal 2. Signal $\alpha$ may be generated from potentiometer 3 forming part of a voltage divider network. Signal $\phi$ is also provided to control unit 1 and indicates the position of throttle valve 4. Signal $\phi$ may be generated by potentiometer 5 also forming part of a voltage divider network. Signals $\alpha$ and $\phi$ are processed by control unit 1 to provide an output signal for controlling stepper motor 7. When control unit 1 comprises a micro-processor, the signal pulses for driving stepper motor 7 may be generated by the subroutine shown in FIG. 2, as discussed below.

Stepper motor 7 is coupled to throttle valve 4 and sets throttle valve 4 to the position commanded by control unit 1. Alternatively, stepper motor 7 may be replaced by DC motor 8 which can be driven by control unit 1 through analog converter 9.

During normal operation, control unit 1 controls the operation of throttle valve 4 by issuing commands to stepper motor 7 based upon signals $\alpha$ and $\phi$. When control unit 1 comprises a microprocessor, various subroutines may be used to process these signals to provide the ideal throttle setting for optimum vehicle performance, e.g., maximum fuel efficiency and minimum exhaust emissions. When manual control is desired, throttle valve 4 may be operated by accelerator pedal 2 through clutch 11. Thus, when a malfunction is detected in control unit 1 or any place in the system, throttle valve 4 may be manually operated by accelerator pedal 2. In the manual mode, full operation of the vehicle is available to the driver. Thus, the vehicle is not limited to low speed operation, as are such systems known in the prior art.

Figure 2:
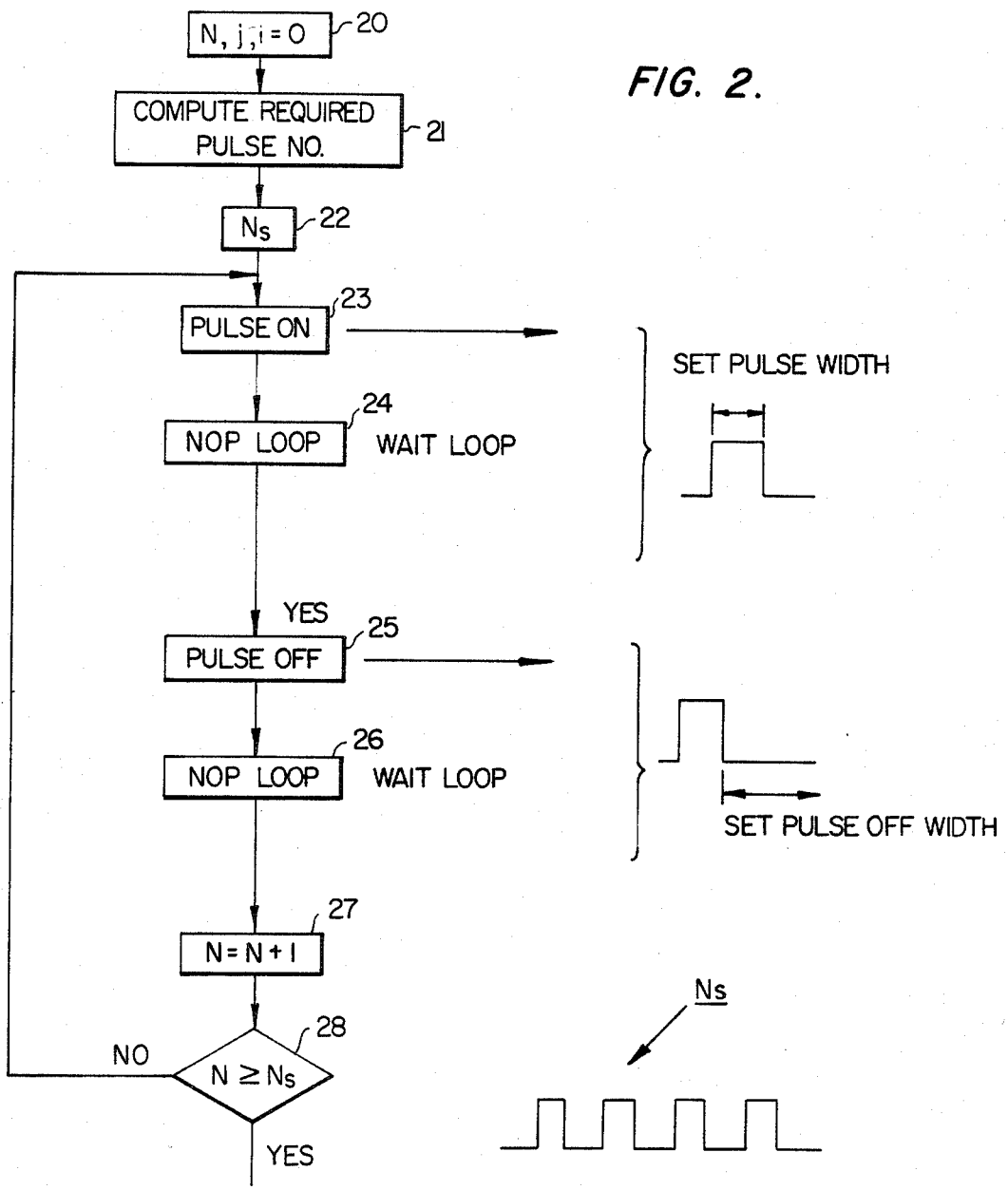
FIG. 2 is a flow chart illustrating a computer subroutine used to generate pulses for driving a DC stepper motor in accordance with the present invention.

The control system in accordance with the present invention may also be used in conjunction with a continuously variable transmission. At high transmission ratios, it is desirable for the throttle valve to be directly controlled by the accelerator pedal when the vehicle is starting up. However, at low transmission ratios where the vehicle has reached operating speed, automatic control of the throttle is preferred. Thus, control unit 1 may be programmed to detect the transmission ratio in a continuously variable transmission and switch to the optimum control mode for the throttle.

Where stepper motor 7 is used to operate throttle valve 4, as opposed to DC motor 8, and control unit 1 comprises a microprocessor, the micro-processor may be programmed to generate the appropriate pulses for controlling the stepper motor. With reference to FIG. 2, a flow chart is provided which illustrates the operation of a computer subroutine which may be used to generate the appropriate pulses. During step 20, N, j and i are initialized to zero. These valves are used as counters during execution of the subroutine. In step 21, the required number of pulses is calculated and assigned to variable $N_s$ in step 22. The subroutine then proceeds to step 23 where the pulse is turned on. The subroutine then enters the wait loop shown in step 24 for the duration of the on-pulse width. The pulse is then turned off in step 25 and a second wait loop is entered in step 26. The wait loop in step 26 establishes the off-pulse width. After the wait loop in step 26 is completed, the subroutine enters step 27 where counter N is advanced to indicate that another pulse has been completed. The subroutine then enters step 28 where counter N is compared to $N_s$ which indicates the total number of pulses required. If N is less than $N_s$, the subroutine loops back to generate another pulse. If N is equal to or greater than $N_s$, then the subroutine is completed.

With reference to FIG. 3, the operation of switching from automatic control of throttle valve 4 to manual control by accelerator pedal 2 will be described. When it is desired to switch from automatic to manual control, clutch 11 is engaged as indicated in step 30 and the power to stepper motor 7 or DC motor 8 is removed as indicated in step 31. When the motor is deenergized, throttle valve 4 is urged toward a closed position by the action of spring 10 (see FIG. 1). Because the electrical power has been removed from the motor, its shaft, which is connected to throttle valve 4, freely turns as throttle valve 4 moves toward a closed position. Accelerator pedal position signal $\alpha$ is compared to throttle position signal $\phi$ in step 32. If signal $\alpha$ equals signal $\phi$, the subroutine is completed and a return is executed indicating that the switch from automatic to manual control is complete. If signal $\alpha$ does not equal signal $\phi$, the subroutine proceeds to step 33 where signal $\alpha$ is compared to zero. Zero indicates that the accelerator pedal is no longer depressed. If $\alpha$ does not equal zero, the subroutine loops back to step 32. However, if $\alpha$ equals zero, the subroutine proceeds to step 34 where clutch 11 is disengaged. The subroutine then enters the wait loop shown in step 35. The wait loop is provided to insure that throttle valve 4 returns to the closed position by the operation of spring 10 before clutch 11 is engaged in step 36, i.e., $\phi$ equals zero. The subroutine then executes a return indicating that the switch from automatic to manual control is complete.

In the above-described subroutine, switching from the automatic mode to the manual mode is not completed until the state of the fuel delivery system as indicated by $\phi$ corresponds to an actual output power or torque which is substantially equal to the desired output power or torque commanded by accelerator pedal 2 as indicated by $\alpha$. This is the logic decision performed in step 32 of the subroutine. Where $\phi=\alpha$, i.e., $\phi$ corresponds to an actual output power or torques which is equal to the desired output power of torque commanded by $\alpha$, the switch from automatic to manual is complete and the return from the subroutine in step 37 is executed. Also when $\alpha=0$ in step 33, i.e., accelerator pedal 2 is not depressed or desired output power is zero, and $\phi=0$ at the end of step 35, i.e., actual output power is zero, the switch from automatic to manual is complete and the return from the subroutine in step 37 is executed.

With reference to FIG. 4, the operation of switching from manual to automatic control when throttle valve 4 is driven by a DC motor will be described. As shown in step 40, electrical power is provided to the DC motor. The subroutine then proceeds to step 41 where clutch 11 is disengaged. The subroutine then executes the return shown in step 42 indicating that the switch from manual to automatic control is complete.

FIG. 5 illustrates a flow chart for a computer subroutine when switching from manual to automatic control where throttle valve 4 is driven by a stepper motor. As shown in step 50, clutch 11 is first disengaged. The subroutine then enters the wait loop shown in step 51 before electrical power is provided to the stepper motor in step 52.

Figure 6:
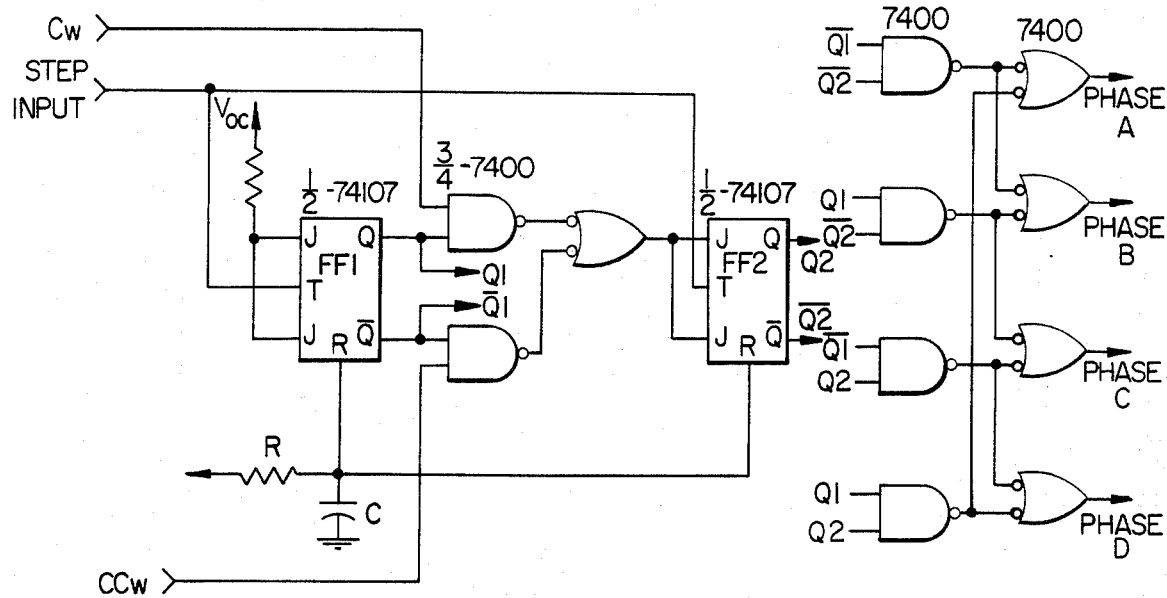
FIG. 6 illustrates an example of a logic sequencer used to drive the phase drivers for a stepper motor.
Figure 7:
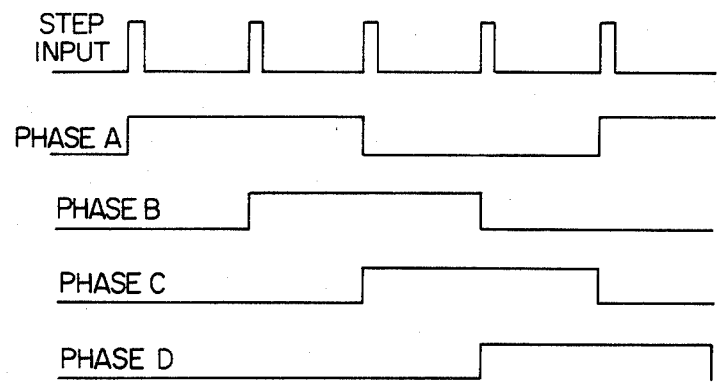
FIG. 7 illustrates the waveforms for the step input and phase outputs for the logic sequencer shown in FIG. 6.
Figure 8:
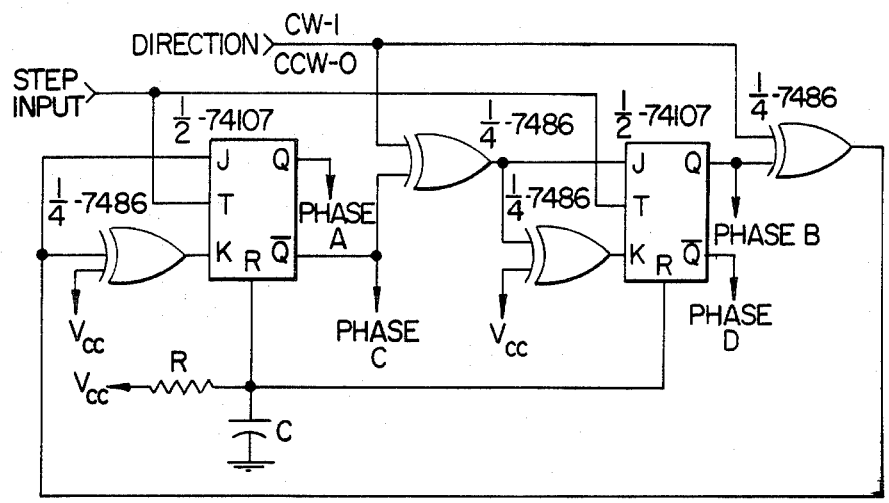
FIG. 8 illustrates an example of another logic sequencer which may be used to drive the phase drivers for a stepper motor.
Figure 9:
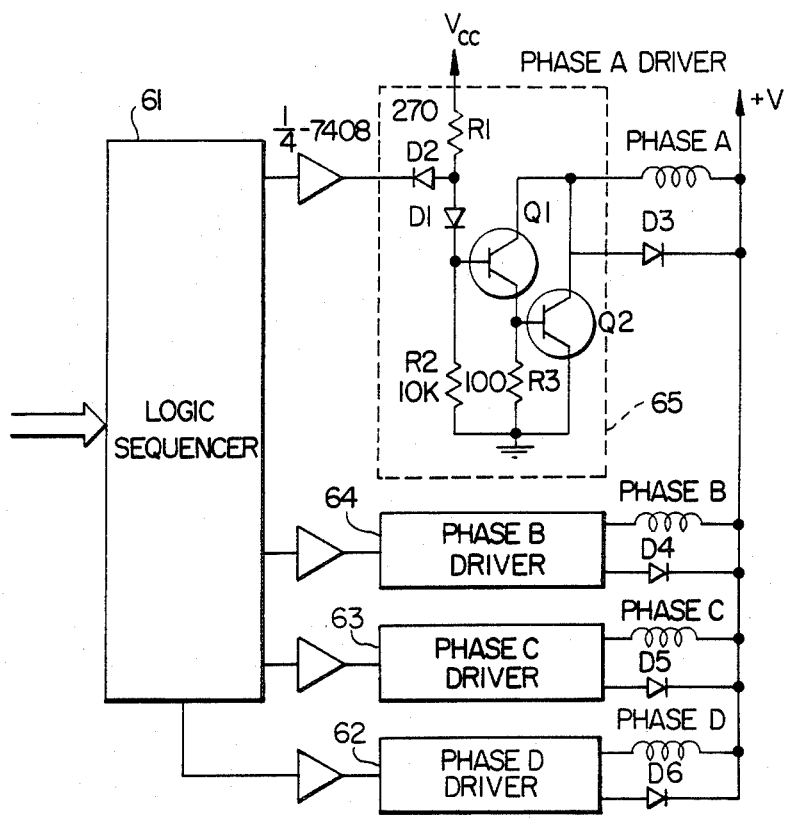
FIG. 9 is a block diagram and partial schematic showing the logic sequencer of FIG. 6 or FIG. 8 and the phase drivers for a stepper motor.

FIG. 9 illustrates an interface which may be used between control unit 1 and stepper motor 7. The interface comprises logic sequencer 61 for receiving control signals from unit 1 and phase drivers 62-65 which drive the stepper motor. FIGS. 6 and 8 illustrate two embodiments of a logic sequencer which may comprise logic sequencer 61, and FIG. 7 illustrates the various signals associated with the logic sequencer.

Figure 10:
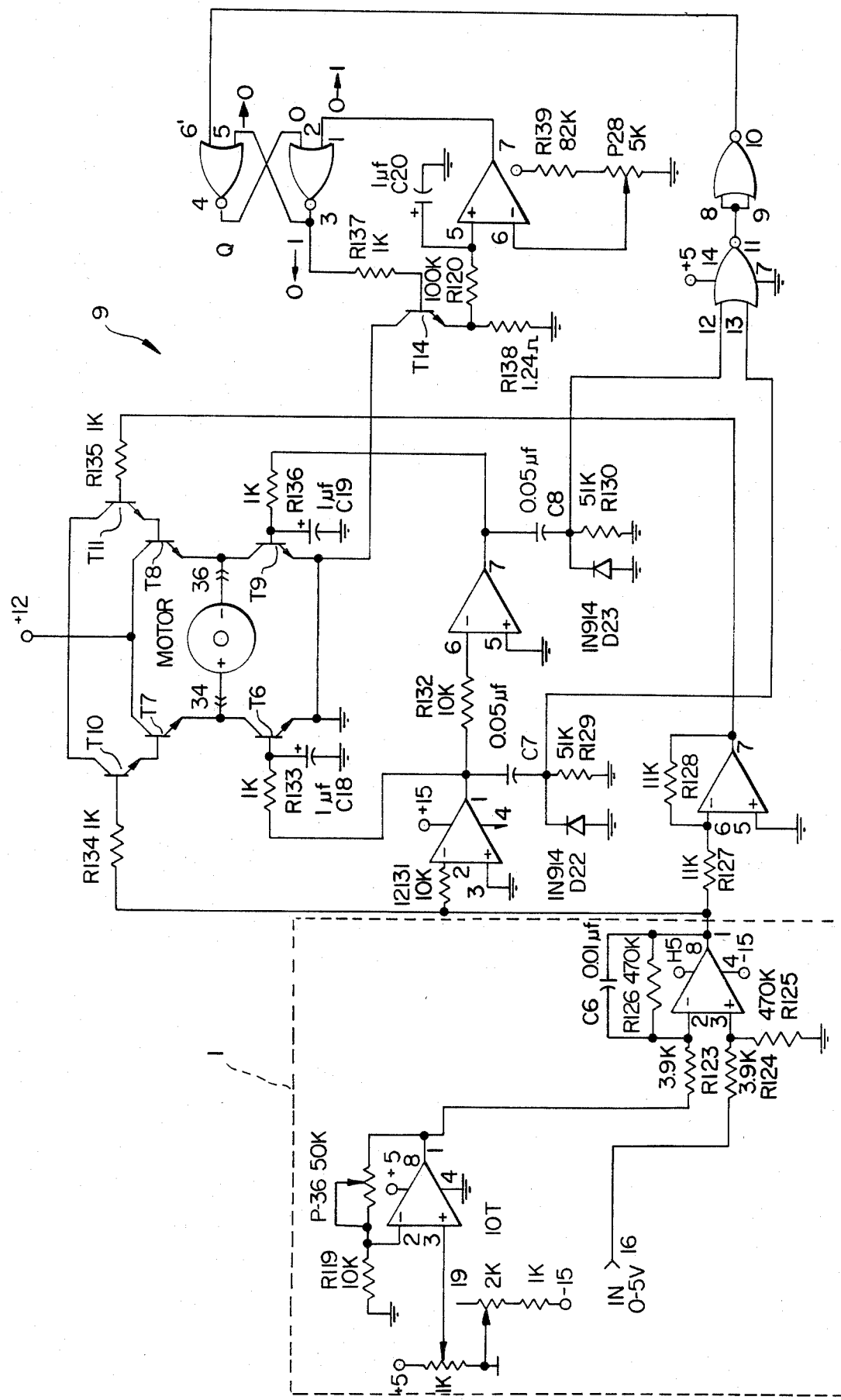
FIG. 10 is a schematic diagram of a partial control unit in accordance with the present invention and an analog converter for driving a DC motor.

FIG. 10 is a schematic diagram illustrating a simplified control unit 1 using discrete components and analog converter 9 used to drive DC motor 8.

Obviously, many modifications and variations of the abovedescribed preferred embodiments will become apparent to those skilled in the art from a reading of this disclosure. It should be realized that the invention is not limited to the particular system disclosed, but its scope is intended to be governed only by the scope of the appended claims.

I claim:

1. A system for effecting either automatic or manual control of a fuel delivery system for delivering a variable quantity of fuel to the engine of a power delivery system, said system comprising:
   command means for commanding a desired output power or torque from said engine;
   measuring means for measuring the state of the fuel delivery system;
   automatic control means operatively coupled to said command means and said measuring means for controlling the operation of said fuel delivery system as a function of the desired output power or torque commanded by said command means and the measured state of the fuel delivery system;
   manual control means operatively coupled to said command means for manually controlling the operation of said fuel delivery system as a function of the desired output power or torque commanded by said command means; and
   switching means for switching the control of said fuel delivery system from said automatic control to said manual control when both a first predetermined condition is detected and the state of the fuel delivery system as measured by said measuring means corresponds to an actual output power or torque which is substantially equal to the desired output power or torque commanded by said command means.

2. The system of claim 1 wherein said automatic control means changes the operation of said fuel delivery system at a rate which is related to the difference between the desired output power commanded by said command means and the state of the fuel delivery system as measured by said measuring means.

3. The system of claim 1 wherein said switching means includes detecting means for detecting said first predetermined condition when said automatic control means is controlling the operation of said fuel delivery system, said switching means switching control of said fuel control means from said automatic control means to said manual control means when said first predetermined condition is detected.

4. The system of claim 1 wherein said switching means including input means for receiving a first input signal corresponding to said first predetermined condition for causing said switching means to switch control of said fuel delivery system from said automatic control means to said manual control means and a second input signal corresponding to a second predetermined condition for causing said switching means to switch control of said fuel delivery system from said manual control to said automatic control.

5. The system of claim 3 wherein said switching means includes means for switching control of said fuel delivery system from said manual control means to said automatic control means when a second predetermined condition is detected by said detecting means.

6. The system of claim 1 wherein said fuel delivery system comprises a throttle valve drivable by a DC motor, said DC motor being controlled by said automatic control means.

7. The system of claim 6 wherein said DC motor is a stepper motor.

8. The system of claim 6 wherein said throttle valve is further drivable by a mechanical linkage operatively coupled to said command means through a clutch, said clutch being controlled by said automatic control means.

9. The system of claim 6 wherein said measuring means measures the position of said throttle to determine the state of said fuel delivery system.

10. The system of claim 1 wherein said automatic control means comprises a micro-processor.

11. The system of claim 4 wherein said first predetermined condiiton is a signal corresponding to a continuously variable transmission ratio below which the starting clutch of said power delivery system is fully engaged and said second predetermined condition is a signal corresponding to a continuously variable transmission ratio above which the starting clutch of said power delivery system is partially engaged.

12. A method for effecting either automatic or manual control of a fuel delivery system for delivering a variable quantity of fuel to the engine of a power delivery system, comprising the steps of:
    commanding a desired output power or torque from said engine;
    measuring the state of the fuel delivery system;

automatically controlling the operation of said fuel delivery system as a function of the desired output power or torque commanded and the meaured state of the fuel delivery system;

manually controlling the operation of said fuel delivery system as a function of the desired output power or torque commanded;

switching the control of said fuel delivery system from said automatic control to said manual control when both a first predetermined condition is detected and the measured state of the fuel delivery system corresponds to an actual output power or torque which is substantially equal to the desired output power or torque commanded.

13. The method of claim 12 wherein said step of automatically controlling the operation of said fuel delivery means changes the operation of said fuel delivery system at a rate which is related to the difference between the desired output power commanded and the measured state of the fuel delivery system.

14. The method of claim 12 wherein said step of switching includes detecting a first predetermined condition when automatically controlling the operation of said fuel delivery system and switching control of said fuel delivery system from said automatic control to said manual control when said first predetermined condition is detected.

15. The method of claim 12 wherein said step of switching includes receiving a first input signal corresponding to said first predetermined condition for causing said switching to switch control of said fuel delivery system from said automatic control to said manual control and receiving a second input signal corresponding to said second predetermined condition for causing said switching to switch control of said fuel delivery system from said manual control to said automatic control.

16. The method of claim 14 wherein said switching step includes switching control of said fuel delivery system from said manual control to said automatic control when a second predetermined condition is detected.

* * * * *